Figure 1:
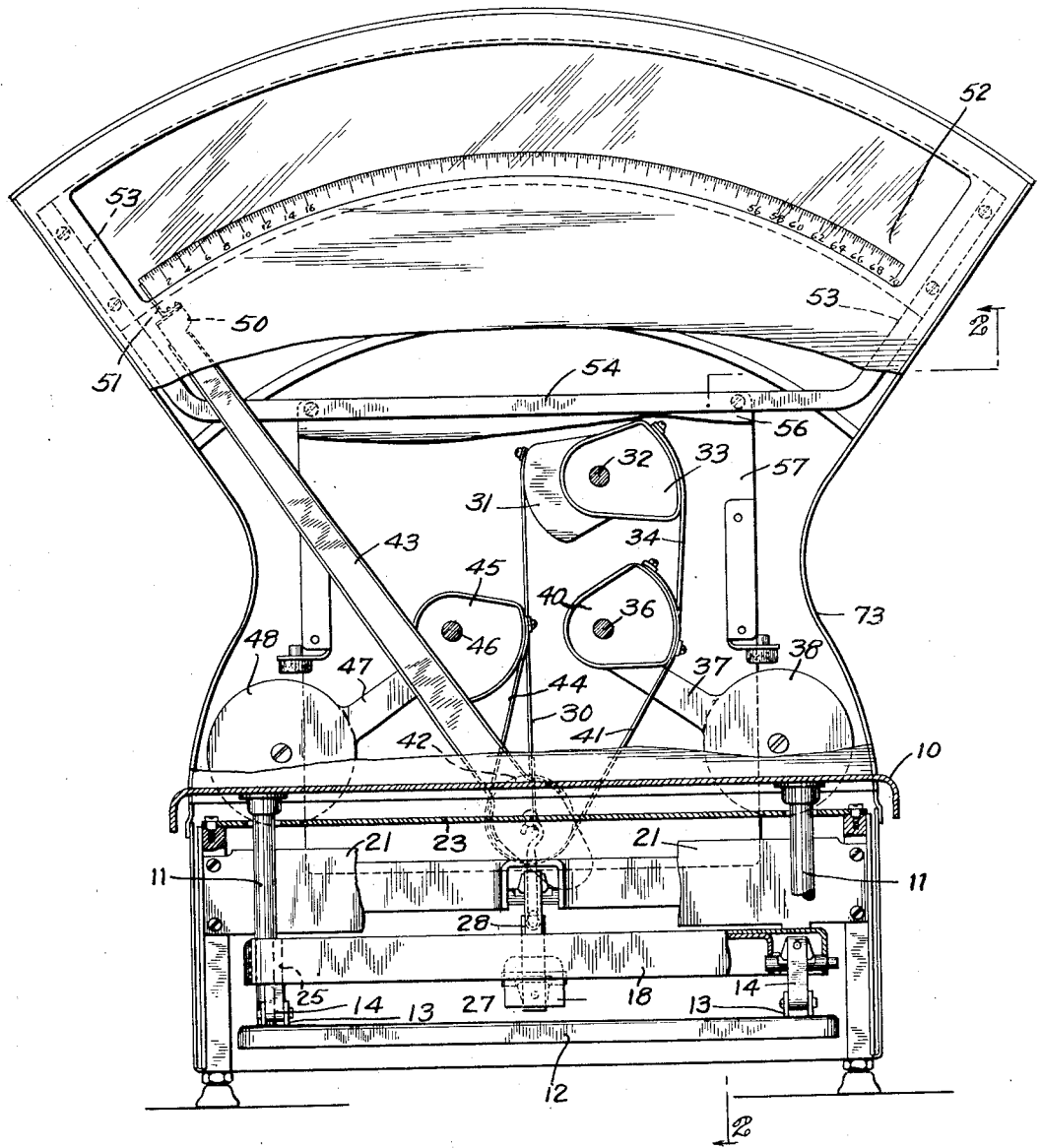

July 2, 1935.    J. J. KLOSTERMAN    2,006,864
SCALE
Filed Oct. 30, 1931    2 Sheets-Sheet 1

INVENTOR
Joseph J. Klosterman
BY   ATTORNEY

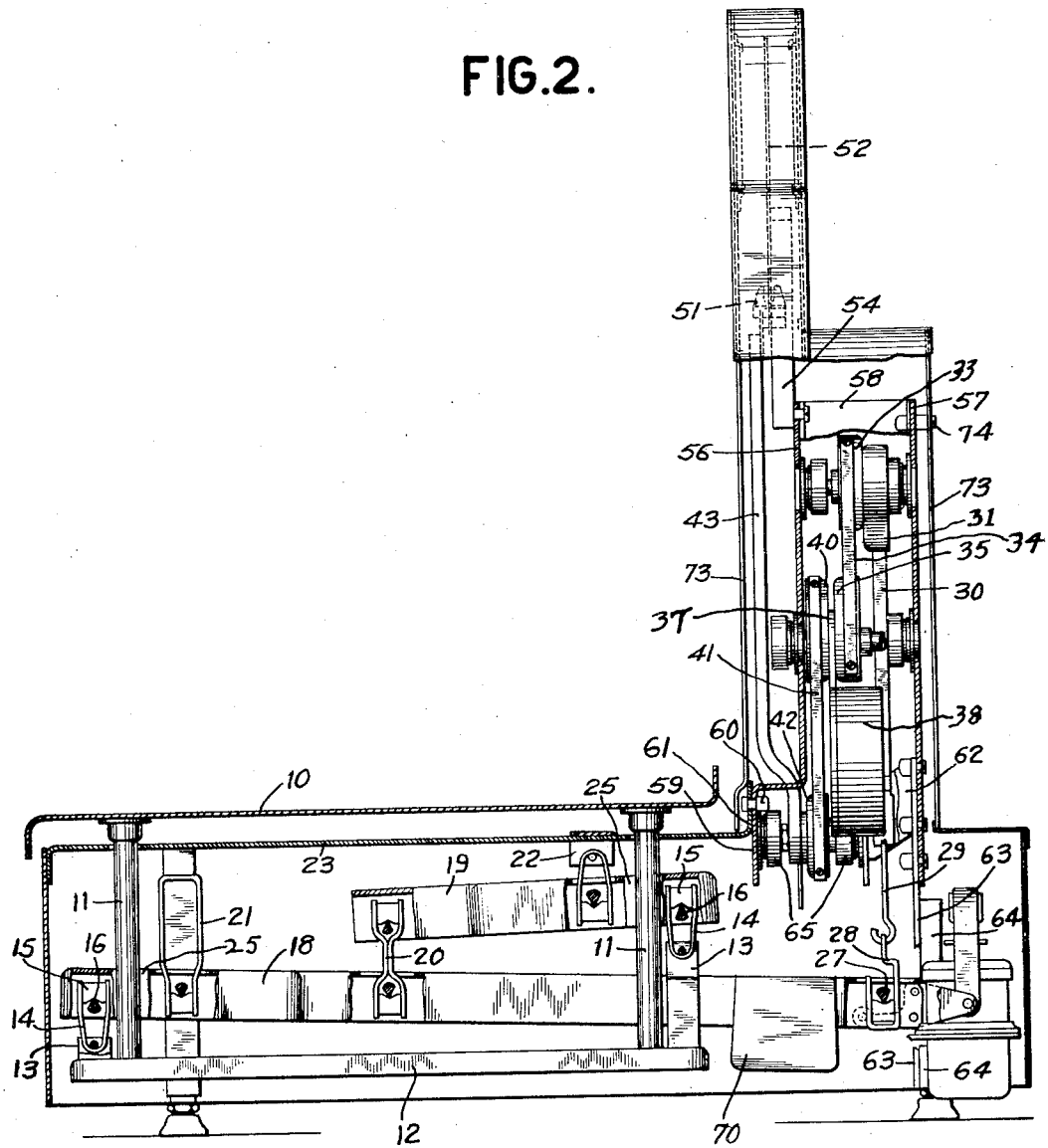

Patented July 2, 1935

2,006,864

UNITED STATES PATENT OFFICE 2,006,864

SCALE

Joseph J. Klosterman, Dayton, Ohio, assignor, by mesne assignments, to The Hobart Manufacturing Company, Troy, Ohio, a corporation of Ohio Application October 30, 1931, Serial No. 572,073

4 Claims. (Cl. 265—62)

This case relates to weighing scales and is directed to improvements in the general construction and in details thereof.

The object in general is to provide a novel means for supporting movable scale members in a manner to facilitate assembly and sealing of the scale.

Further, an object is to provide a novel arrangement of counterbalancing and indicating members.

Still further, the object is to provide a novel fan scale in which the use of gear members is wholly avoided.

Further and other objects and advantages will be hereinafter set forth in the accompanying specification and claims, and shown in the drawings, which by way of illustration show what is now considered to be the preferred embodiment of the invention.

In the drawings:

Fig. 1 is a front view of the scale with the lower and intermediate casings broken away to show the interior, and Fig. 2 is a vertical section through Fig. 1 taken on line 2—2 of Fig. 1.

Referring to the drawings in detail, the platform 10 is supported on top of four vertical posts 11 carried at the lower end by a plate 12 having upwardly extending members 13 depending from yokes 14. The latter have bearings 15 resting on knife edges 16 of long and short levers 18 and 19, respectively, both of the first principle, and connected by link 20. Long lever 18 is fulcrumed on frame piece 21 while short lever 19 is supported by a member 22 carried by the top plate 23.

The levers are fan-shaped being wide at the rear, as may be seen from Fig. 1. The platform bearing posts 11 pass through the openings 25 at each side of the wide parts of the levers, thus permitting a minimum spacing between the posts at the same end. The width of the base is therefore narrower than if the posts passed outside the levers. This minimum width of base is obtained without sacrificing the width of the levers and the distance between their fulcrum supports, which increases the stability of the levers and consequently the entire scale.

The nose end of the long lever 18 is channeled and carries knife edge 27 cradled in stirrup 28 attached to hook 29 in turn connected to tape 30. Tape 30 is secured to the arcuate periphery of a sector 31 fast to a shaft 32 which at the side of sector 31 rigidly carries a cam sector 33. The shape of sector 33 is designed to compensate for angularity of movement of the pendulums, to be described, and thus cause equal movements of the indicator for equal increments of load.

Sector 33 is connected by a tape 34 to the arcuate periphery of a sector 35 secured to a shaft 36 below shaft 32. At the side of sector 35, shaft 36 carries the pendulum arm 37 provided with the pendulum weight 38. On shaft 36 is also secured an arcuate sector 40 connected by a tape 41 to the hub 42 of an indicator hand 43. Hub 42 is connected by a tape 44 to the arcuate periphery of a sector 45 fast to a shaft 46 carrying a pendulum arm 47 and its weight 48.

The indicator hand 43 is channeled to provide rigidity. At its upper end, the base 50 of the channel extends beyond the sides and is bent at right angles to the length of the hand to form a support for a thin stamping comprising an index 51. The plane of the latter is at right angles to the plane of base 50 of the hand 43 and also to the plane of a fan chart 52 graduated on both faces. The index 51 is bifurcated to straddle the lower edge of the chart, each furcation coacting as an index with the adjacent side of the chart.

The chart is screwed to the diverging legs 53 of a formed steel bar 54 which is attached at the base to the front plate 56 of the intermediate frame. Parallel to plate 56 is rear plate 57, the plates being spaced and rigidly connected by end channels 58. The lower end of the front plate 56 is angularly, outwardly, bent and secured by bolts 60 to the flange 61 of cover plate 23.

Rear plate 57 is bolted at its lower end to a bracket 62 and to a plate 63 secured to the frame posts 64. Bracket 62 and the lower angular portion of plate 56 carry journals 65 for rotatably mounting the shaft of the indicator hand 43. Similar journals are carried by plates 56 and 57 for rotatably mounting the shafts 32, 36, and 46.

The upper section of the scale including the intermediate frame consisting of side plates 56, 57, end channels 58, and all the parts mounted thereon including bar 54, chart 52, shafts 32, 36, 46, the parts carried thereby and the indicator assembly constitute a unit which is adapted for complete assembly by itself and is sealed or adjusted independently of the rest of the scale.

The lower section of the scale is assembled as a unit, conterweight 70 being of such weight as to maintain the lever system in a position for holding the pendulums in outermost angular positions.

After being separately assembled and adjusted, the lower and upper sections of the scale are fixed relatively to each other at the front by bolts 60 securing flange 61 to the lower angular end of the front wall and at the back by suitably attaching plate 63 to the frame posts 64.

The connections between tape 30 and nose pivot 27 are then made and the scale is ready for weighing.

After securing the lower and upper sections together, the outer casing 73 for the upper section is placed in position. This casing is fixed relative to the intermediate frame by bolts 74 which connect the casing to the rear wall 57.

Due to the separate assembly and sealing of the lower and upper scale sections, the sections may be separately formed and interchangeably applied to similarly interchangeable lower sections. Further, if one section becomes damaged, it may be replaced by a similar section whereas formerly the entire scale had to be rebuilt or discarded.

The sections are secured together so that the lower portion of the upper section is located within the interior of the base. Thus, the lower part of finger 43 and the mounting therefor are within the base; the pendulums are adapted to swing into the interior of the base. This provides for a minimum vertical dimension of the scale for particular sizes and capacities of scale parts.

In operation of the scale, at no load position, the base system is so adjusted as to hold pendulums 38 and 48 in outermost advanced positions. When a load is placed on platform 10, the nose end of lever 18 moves upwardly, decreasing the pull on tape 30 and therefore on the pendulum system connected thereto. The pendulums thereupon move to lower positions for balancing the force of the base system. As the pendulums move to lower positions, the hub 42 of the indicator is rocked through tapes 41 and 44 clockwise (as viewed in Fig. 1) to indicate the load on chart 52.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims:

I claim:

1. In a scale, a load support, a base lever system carrying the support, a rockable member separate from the base lever system, an operating connection rising from the base lever system to the rockable member, a pendulum counterbalance mounted separately and independently of the rockable member and below the rockable member, an operating connection depending from the rockable member to the counterbalance, and an indicator mounted apart and independently of the counterbalance and below the counterbalance and operatively connected to the latter.

2. In a scale, a load support, a base lever system carrying the support, a rockable member, a flexible connection between said member and the system, a pendulum counterbalance, a flexible connection between the counterbalance and said member, an indicator mounted below the counterbalance, and a flexible connection between the indicator and the counterbalance.

3. In a scale, a load support, a base lever system carrying the support, a rockable member, a flexible connection between said member and the system, a pair of pendulum counterbalances, a depending connection from said member to one of the counterbalances, an indicator and its shaft mounted separately from and below the pendulum counterbalances, and a tape drive for the indicator depending from both the pendulum counterbalances to the indicator shaft to rotate the indicator in accordance with the load.

4. In a scale, a load support, a pair of pendulums operated thereby, parallel, spaced, supports for the pendulums, an indicator hand mounted below the pendulum supports and along a vertical line passing between the pendulum supports, the indicator hand extending above the pendulum supports, a fan chart above the pendulum supports scanned by the outer end of the indicator hand, and a flexible depending, operating connection from each pendulum to the indicator hand.

JOSEPH J. KLOSTERMAN.